(12) United States Patent
Chen et al.

(10) Patent No.: US 11,341,227 B2
(45) Date of Patent: May 24, 2022

(54) VERIFICATION CODE GENERATION METHOD AND APPARATUS, COMPUTER DEVICE, AND STORAGE MEDIUM

(71) Applicant: Tencent Technology (Shenzhen) Company Limited, Shenzhen (CN)

(72) Inventors: Zhuoming Chen, Shenzhen (CN); Yong Yang, Shenzhen (CN); Jie Zhang, Shenzhen (CN); Meng Chen, Shenzhen (CN); Xiaochen Liu, Shenzhen (CN); Yiwen Jia, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 268 days.

(21) Appl. No.: 16/588,460

(22) Filed: Sep. 30, 2019

(65) Prior Publication Data

US 2020/0026844 A1 Jan. 23, 2020

Related U.S. Application Data

(63) Continuation of application No. PCT/CN2018/110210, filed on Oct. 15, 2018.

(30) Foreign Application Priority Data

Oct. 17, 2017 (CN) .......................... 201710967338.8

(51) Int. Cl.
*G06F 21/36* (2013.01)
*G06F 21/46* (2013.01)
(52) U.S. Cl.
CPC .............. *G06F 21/36* (2013.01); *G06F 21/46* (2013.01); *G06F 2221/2133* (2013.01)

(58) Field of Classification Search
CPC ... G06F 21/36; G06F 21/46; G06F 2221/2133
See application file for complete search history.

(56) References Cited

U.S. PATENT DOCUMENTS

| 8,959,621 B2* | 2/2015 | Snelling | .................. | H04L 63/08 |
| | | | | 726/19 |
| 2007/0300307 A1* | 12/2007 | Duncan | .................. | G06F 21/31 |
| | | | | 726/27 |

(Continued)

FOREIGN PATENT DOCUMENTS

| CN | 102103670 A | 6/2011 |
| CN | 104135365 A * | 11/2014 |

(Continued)

OTHER PUBLICATIONS

English translation for CN-104468101-A (Year: 2015).*

(Continued)

*Primary Examiner* — Daniel B Potratz
*Assistant Examiner* — Wansik You
(74) *Attorney, Agent, or Firm* — Morgan, Lewis & Bockius LLP (57) ABSTRACT

A verification code generation method is performed at a computing device. The method includes: obtaining at least one pattern; determining an association relationship between the patterns and object attributes of the one or more objects in the patterns; generating at least one verification question according to the association relationship, and correspondingly marking an answer pattern matching each verification question from the at least one pattern; and generating at least one verification code picture according to the at least one pattern, the object attributes in the patterns, and the generated verification question, patterns in the verification code picture satisfying the association relationship, the verification code picture corresponding to the at least one verification question, the verification code picture including an (Continued)

answer area matching the corresponding verification question, and the answer area being an effective operation area that is determined according to an answer pattern of the corresponding verification question.

20 Claims, 7 Drawing Sheets

(56) References Cited

U.S. PATENT DOCUMENTS

| | | |
|---|---|---|
| 2015/0121467 A1 | 4/2015 | Yun et al. |
| 2017/0093864 A1 | 3/2017 | Pestun |

FOREIGN PATENT DOCUMENTS

| | | | |
|---|---|---|---|
| CN | 104468101 A | * | 3/2015 |
| CN | 104468101 A | | 3/2015 |
| CN | 104580117 A | | 4/2015 |
| CN | 105323066 A | | 2/2016 |
| CN | 106250756 A | | 12/2016 |

OTHER PUBLICATIONS

English translation for CN-104135365-A (Year: 2014).*
Tencent Technology, WO, PCT/CN2018/110210, dated Jan. 4, 2019, 4 pgs.
Tencent Technology, IPRP, PCT/CN2018/110210, dated Apr. 21, 2020, 5 pgs.
Tencent Technology, ISR, PCT/CN2018/110210, dated Jan. 4, 2019, 2 pgs.

* cited by examiner

VERIFICATION CODE GENERATION METHOD AND APPARATUS, COMPUTER DEVICE, AND STORAGE MEDIUM

CROSS-REFERENCE TO RELATED APPLICATIONS

This application is a continuation application of PCT/CN2018/110210, entitled "VERIFICATION CODE GENERATION METHOD AND APPARATUS, COMPUTER DEVICE, AND STORAGE MEDIUM" filed on Oct. 15, 2018, which claims priority to Chinese Patent Application No. 201710967338.8, entitled "VERIFICATION CODE IMPLEMENTATION METHOD AND APPARATUS, AND STORAGE MEDIUM" filed with National Intellectual Property Administration, PRC on Oct. 17, 2017, all of which are incorporated by reference in their entirety.

FIELD OF THE TECHNOLOGY

The present disclosure relates to the field of terminal and application technologies, and in particular, to a verification code generation method.

BACKGROUND OF THE DISCLOSURE

In the Internet, verification codes are used to distinguishing real humans from computers. The verification codes may be used for preventing bad people from behaviors such as violently cracking a user password by using an automation program, maliciously swiping votes, and maliciously issuing content in batches. Specifically, in a verification code test, a computer used as a server automatically generates a question, the question is answered by a user, and determining is performed by the computer. Because questions can only be answered by humans, and the computer cannot resolve the question of the verification code, a user that finally answers the question may be regarded as a human.

A character-type verification code and sliding of a puzzle are currently mainly used. The character-type verification code requires the user to input characters but may be easily cracked by machines. A verification code in the behavior of sliding of a puzzle lacks confrontation, and a behavior trail may be easily replayed and attacked.

Therefore, questioning verification codes that distinguish humans from computers have low anti-cracking performance, can be easily learned by machines, and cannot effectively avoid behaviors such as maliciously swiping votes and violently cracking user passwords.

SUMMARY

The present disclosure provides a verification code generation method and apparatus, a computer device, and a storage medium, to resolve a problem in the related technology that anti-cracking performance of a questioning verification code is low.

A first aspect of the present disclosure provides a verification code generation method, applied to a computer device, the method including:

obtaining at least one pattern, each pattern including one or more objects;

determining an association relationship between the patterns and object attributes of the one or more objects in the patterns;

generating at least one verification question according to the association relationship between the patterns and the object attributes of the one or more objects in the patterns, and correspondingly marking an answer pattern matching each verification question from the at least one pattern; and generating at least one verification code picture according to the at least one pattern, the object attributes of the one or more objects in the patterns, and the generated verification question, patterns in the verification code picture satisfying the association relationship, the verification code picture corresponding to the at least one verification question, the verification code picture including an answer area matching the corresponding verification question, and the answer area being an effective operation area in the verification code that is determined according to an answer pattern of the corresponding verification question.

A second aspect of the present disclosure provides a computing device having one or more processors, memory coupled to the one or more processors and a plurality of programs stored in the memory that, when executed by the one or more processors, cause the computing device to perform the aforementioned verification code generation method provided in the first aspect. The method may be implemented by hardware, or may be implemented by hardware executing corresponding software. The hardware or software includes one or more modules corresponding to the foregoing method, and the modules may be software and/or hardware.

A third aspect of the present disclosure provides a non-transitory computer readable storage medium storing a plurality of machine readable instructions in connection with a computing device having one or more processors. The plurality of machine readable instructions, when executed by the one or more processors, cause the computing device to perform the aforementioned verification code generation method provided in the first aspect.

Compared with the related technology, in the solutions provided in the present disclosure, after at least one pattern is obtained, at least one verification question is generated according to an association relationship between the patterns and object attributes in the patterns, and an answer pattern matching each verification question is correspondingly marked from the at least one pattern. Because the association relationship between the patterns and the object attributes in the patterns may include different dimensions of the verification question, the dimensions of the verification question generated in this way are obviously enhanced. At least one verification code picture is generated according to the at least one pattern, the object attributes in the patterns, and the generated verification question, patterns in the verification code picture satisfying the association relationship, the verification code picture corresponding to the at least one verification question, the verification code picture including an answer area matching the corresponding verification question, and the answer area being an effective operation area that is determined according to an answer pattern of the corresponding verification question. In the present disclosure, the dimensions of the verification question are enhanced, thereby improving anti-cracking performance of the verification code and improving accuracy of human-machine identity verification as well as confronting a current machine learning algorithm to crack the verification code.

BRIEF DESCRIPTION OF THE DRAWINGS

FIG. 1-1 is a schematic architectural diagram of a server according to an embodiment of the present disclosure.

FIG. 1-2 is a schematic architectural diagram of a production background according to an embodiment of the present disclosure.

DESCRIPTION OF EMBODIMENTS

In the specification, claims, and accompanying drawings of the present disclosure, the terms "first", "second", and so on are intended to distinguish between similar objects rather than indicating a specific order. It is to be understood that data used in this way can be interchanged in an appropriate case, so that the embodiments that are described herein can be implemented in a sequence other than content illustrated or described herein. Moreover, the terms "include", "contain" and any other variants mean to cover the non-exclusive inclusion. For example, a process, method, system, product, or device that includes a series of steps or modules is not necessarily limited to those steps or modules that are expressly listed, but may include other steps or modules not expressly listed or inherent to such a process, method, product, or device. Module division appearing in the present disclosure is merely logical division and may be other division during implementation in actual application. For example, a plurality of modules may be combined or integrated into another system, or some features may be ignored or not performed. In addition, the displayed or discussed mutual coupling, or direct coupling, or communication connections may be implemented through some interfaces. Indirect coupling or communication connections between the modules may be implemented in electric or other forms. This is not limited in the present disclosure. In addition, the modules or sub-modules described as separation parts may be or may not be physically separated, or may be or may not be physical modules, or may be distributed to a plurality of circuit modules. Some or all of the modules may be selected according to actual requirements to achieve the objective of the solutions of the present disclosure.

Figure 11:
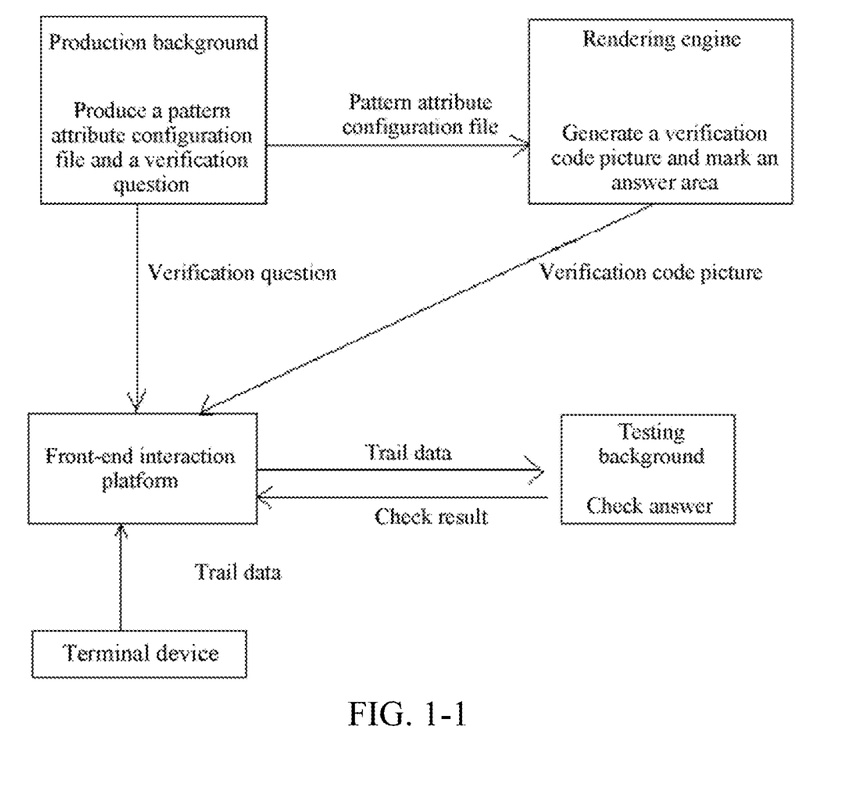
FIG. 11 is a schematic structural diagram of a server according to an embodiment of the present disclosure.

The present disclosure provides a verification code generation method and apparatus, a computer device, and a storage medium. The method may be applied to the computer device. The computer device may be a server. The server may be configured to generate a verification code and perform verification code verification on a terminal device accessing the server. In some implementations, as shown in FIG. 1-1, the server in the embodiments of the present disclosure mainly includes three functional parts: a production background, a front-end interaction platform, and a check background.

Figure 12:
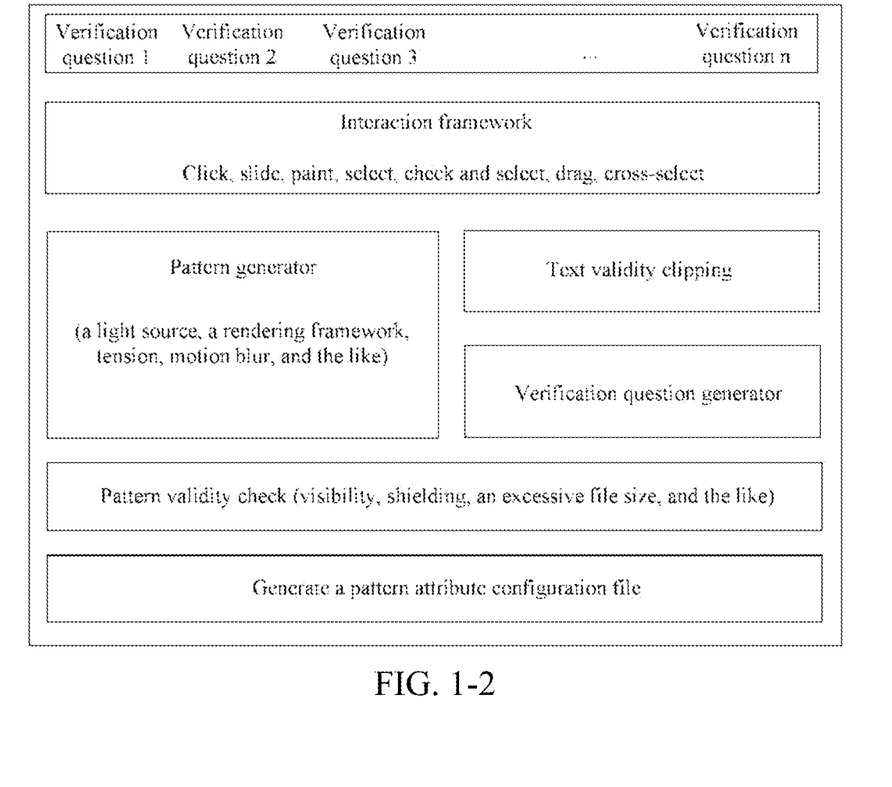

The production background is mainly configured to generate a pattern, a pattern attribute configuration file, a verification code picture, and a verification question. The production background may further include a rendering engine. The rendering engine may be configured to render the pattern, to obtain the verification code picture. The rendering engine may be integrated in the production background or may be independently deployed. This is not specifically limited in the present disclosure. FIG. 1-2 is a schematic architectural diagram of a production background. After generating a pattern attribute configuration file, the production background performs pattern validity check. A verification question generator matches an existing question rule base based on the pattern attribute configuration file to generate verification questions (such as a verification question 1, a verification question 2 . . . and a verification question n). A pattern generator renders a verification code picture and an answer area according to object attributes in the patterns and performs text validity clipping on the generated verification code picture. The answer area is transmitted to a check background for use as a standard for correct answers, and the verification code picture and the verification question are transmitted to a front-end interaction platform and are presented to a user. An interaction framework is used for interacting with the user, and the user is verified by obtaining input of the user for the verification question.

The front-end interaction platform is mainly configured to interact with verification code verification of the terminal device and may be implemented in a form of a web page, an interactive application, or a server side. The front-end interaction platform may store the verification code picture and the verification question and interacts with the terminal device.

The check background is mainly configured to store the verification question and the verification code picture whose answer area is marked, and verify an answer transmitted by the front-end interaction platform.

After generating the pattern attribute configuration file and the verification question, the production background may transmit the verification question to the front-end interaction platform and transmit the pattern attribute configuration file to a rendering engine. The rendering engine may render the verification code picture based on the pattern attribute configuration file. Then, the rendering engine transmits the rendered verification code picture to the front-end interaction platform.

The front-end interaction platform pushes a verification interaction interface to the terminal device. The terminal device may answer a question on the interaction interface through a web page and an installed client, and input an answer on the interaction interface. After receiving the answer inputted by the terminal device, the front-end interaction platform obtains trail data of the user on the terminal device and then transmits the answer and the trail data to the check background.

The check background checks the answer based on the received answer and the trail data. If check succeeds, a testing result is returned to the front-end interaction platform.

The terminal device in the present disclosure may be a device that provides voice and/or data connectivity to the user, a handled device having a wireless connection function, or another processing device connected to a wireless modem. For example, the terminal device may be a mobile phone (or referred to as a "cellular phone") and a computer having a mobile terminal, such as a portable, pocket-sized, hand-held, computer-built-in, or in-vehicle mobile apparatus, that exchange voice and/or data with a wireless access network. For example, the terminal device may be a device such as a personal communication service (PCS) phone, a cordless phone, a session initiation protocol (SIP) phone, a wireless local loop (WLL) station, or a personal digital assistant (PDA).

Figure 2:
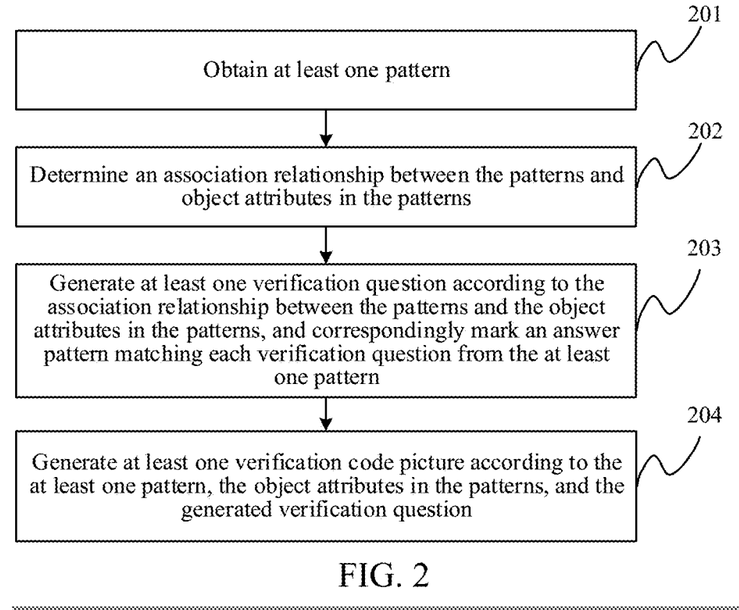
FIG. 2 is a schematic flowchart of a verification code generation method according to an embodiment of the present disclosure.

To resolve the foregoing technical problem, referring to FIG. 2, the following describes a method for implementing a verification code provided in the present disclosure by way of example. The embodiments of the present disclosure mainly include:

201: Obtain at least one pattern.

One pattern may correspond to one object. The object is an object included in the pattern. One pattern includes one or more objects.

In some implementations, the obtained at least one pattern may be generated based on prior knowledge or may be a pattern that is pre-generated and that has a fixed meaning, and then the pattern is added by means of selection, dragging, and the like.

For example, when the at least one pattern is generated based on prior knowledge, it may be directly defined that various types of objects such as a triangle, a cube, a cylinder, an automobile, and a clock are generated, and object attributes such as a color, a size, and a texture may be set for these objects.

For another example, various types of patterns may be pre-obtained. These patterns already have object attributes and then may be selected in a self-defined manner. For example, various types of objects such as a color triangle, cube, cylinder, automobile, and clock may be selected from the patterns.

202: Determine an association relationship between the patterns and object attributes in the patterns.

The object attributes include at least a location of an object in a pattern in a verification code picture, a quantity of same objects, an object size, an object color, an object shape, and an object texture.

The association relationship between the patterns may include at least similarity between the patterns, types of objects shown in the patterns, and a spatial relationship between the patterns. For example, the similarity between the patterns may refer to whether the two patterns represent a same type of object, whether the two patterns represent similar textures, and the like. The spatial relationship between the patterns may refer to the relative position of the two patterns, such as a spatial relationship of the front, rear, left and right or shielding.

203: Generate at least one verification question according to the association relationship between the patterns and the object attributes in the patterns, and correspondingly mark an answer pattern matching each verification question from the at least one pattern.

For each verification question, an answer pattern matching the verification question may be found in the at least one pattern, and the answer pattern corresponding to the verification question is marked from the at least one pattern, to subsequently generate an answer area based on the answer pattern, to check a question answer for the verification question, thereby verifying a user identity.

In some implementations, the generating at least one verification question and marking an answer pattern matching each verification question may specifically include:

(1) The pattern attribute configuration file may be generated according to the association relationship between the patterns and the object attributes in the patterns after the association relationship between the patterns and the object attributes in the patterns are determined. For example, the at least one pattern may be randomly combined, to generate the pattern attribute configuration file. The pattern attribute configuration file includes pattern information of the patterns, the object attributes in the patterns, and a plurality of objects, the objects corresponding to the patterns. For example, the pattern attribute configuration file may include an object shape, a color, a texture, a character, a size, a location, a light source location, a camera angle, and the like. For one pattern, the pattern may represent a cylinder. The cylinder also correspondingly has attributes such as a color, a texture, and a size, and these attributes may be used as object attributes of a pattern to which these attributes belong.

Figure 3:
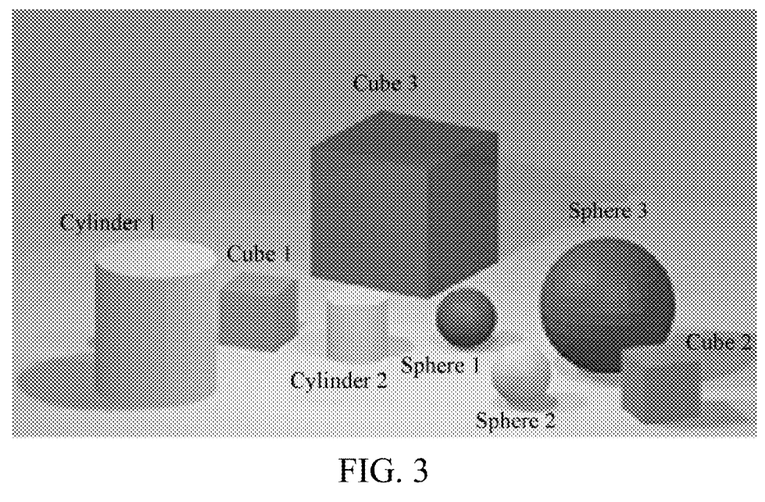
FIG. 3 is a schematic diagram of a verification code picture according to an embodiment of the present disclosure.

For example, as shown in FIG. 3, FIG. 3 presents articles contained in the pattern attribute configuration file. For example, three cubes, three spheres, and two cylinders are included. Two of the three cubes have same sizes, colors, and textures, and a size, a color, and a texture of the third one are different from those of the two. The two cylinders have different sizes and have same colors and textures. Two of the three spheres have same sizes and textures but have different colors, and two spheres have different sizes but same colors and textures.

Optionally, in some implementations, considering that the generated pattern attribute configuration file may affect an actual verification effect because of reasons such as an object being shielded, exceeding a pattern visible area, and overlapping. Therefore, after the pattern attribute configuration file is generated, rasterization may also be performed on the at least one pattern in the verification code picture. By means of rasterization, the at least one pattern is visible in the verification code picture, to determine validity of the verification code picture.

(2) The at least one verification question is generated according to the pattern attribute configuration file.

A rule in a question rule base may be matched according to the pattern attribute configuration file, to generate the at least one verification question.

For example, based on the pattern attribute configuration file shown in FIG. 3, when the pattern attribute configuration file is matched with the question rule base, the following verification questions may be obtained through matching: click two spheres with same sizes in the picture, click two spheres with different sizes but same colors in the picture, and click cubes in the picture. Such verification questions can all be obtained through matching.

In some implementations, question dimensions of the specifically generated verification question may include object attributes such as a quantity, a size, a shape, and a texture and association relationships such as similarity, a spatial relationship, and overlapping.

For example, as shown in FIG. 3, the verification question may also be generated according to a spatial relationship. In this way, verification difficulty can be improved. The following similar verification questions may be generated: click a first cube after a cylinder with a larger size, and click a cube before a red sphere. Such verification questions can all effectively reduce machine learning and improve accuracy of identification of manual answering, and can shield a behavior of maliciously swiping verification codes to some degree.

In some implementations, the following question dimensions may also be added: whether an object is spliced, vagueness of the object, a Chinese character model, and the like, to enlarge a range for question dimensions and enhance anti-cracking performance of the verification code.

(3) An answer pattern that matches each verification question and that is in the pattern attribute configuration file is correspondingly marked from the at least one pattern according to the generated verification question.

Figure 4:
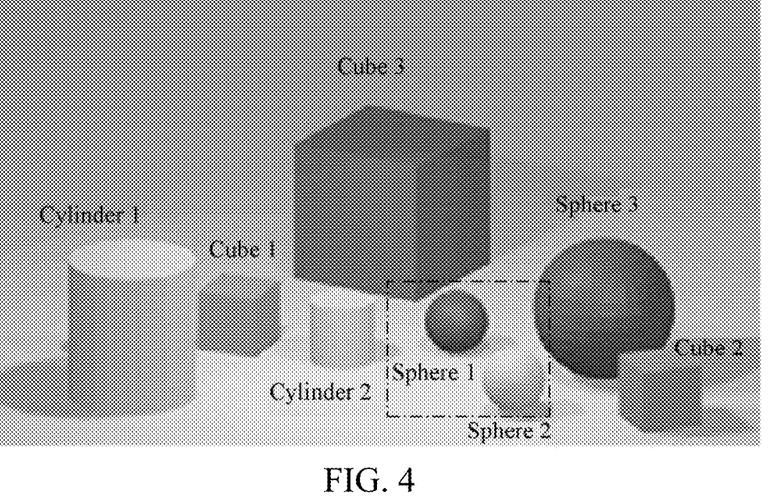
FIG. 4 is another schematic diagram of a verification code according to an embodiment of the present disclosure.
Figure 5:
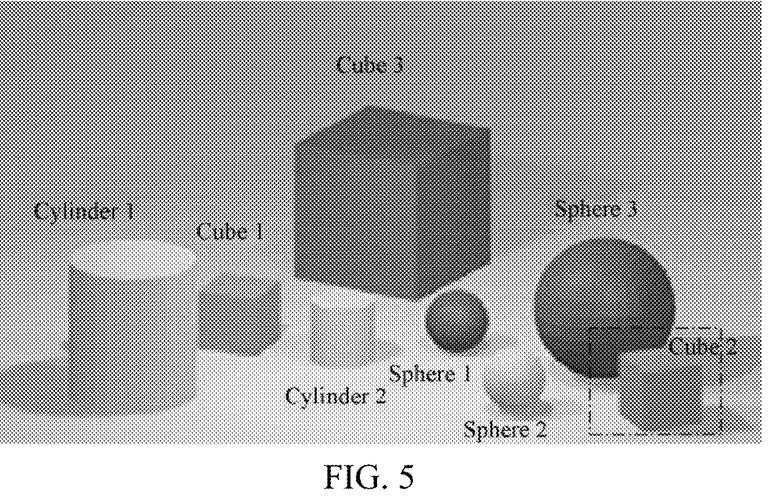
FIG. 5 is another schematic diagram of a verification code according to an embodiment of the present disclosure.

Based on FIG. 3, a plurality of verification questions may be generated from FIG. 3. For a verification question "click two spheres with the same sizes in the picture", a sphere 1 and a sphere 2 may be marked, as shown in FIG. 4. For a verification question "click a cube before a red sphere", a cube 2 may be marked, as shown in FIG. 5. Marks for answer patterns corresponding to other verification questions are similar and are not described in detail. A specific marking manner may be a selected state, cross-select, background lightening, or the like, and is not specifically limited in the present disclosure.

Optionally, in some implementations, when the verification question is generated, an object attribute list in a pattern matching the verification question may be directly generated, to simplify a process of question generation, to improve computing efficiency.

204: Generate at least one verification code picture according to the at least one pattern, the object attributes in the patterns, and the generated verification question.

The patterns in the generated verification code picture satisfy the foregoing determined association relationship. The verification code picture corresponds to at least one verification question, the verification code picture includes the answer area matching the corresponding verification question, and the answer area is an effective operation area that is determined according to an answer pattern of the corresponding verification question.

It may be understood that the object attributes in the patterns identify attributes such as a location of an object in a pattern in a verification code picture, and an object color, size, and shape. The association relationship between the patterns identifies attributes such as the spatial relationship between the patterns, and a type to which an object belongs. In this way, attributes such as a location of an object in at least one pattern, a color, a size, and a shape included in the generated verification code picture satisfy the object attributes in the patterns. Attributes such as the spatial relationship between the at least one pattern included in the verification code picture and a type to which an object belongs satisfy the association relationship between the patterns.

Optionally, when the verification code picture is generated, the at least one pattern may be rendered to generate the verification code picture. For example, the verification code picture may be rendered by using a 2D rendering engine. In this way, a computing load may be reduced.

The at least one pattern is rendered to generate the verification code picture. In a possible implementation, for the generated verification question, the at least one pattern may be rendered in a blank image, such as a blank canvas, according to a location of an object identified by an object attribute, a shape, a color, a size, and the like, and according to the spatial relationship between the patterns identified by the association relationship between the patterns, a type of an included object, and the like, to obtain the verification code picture corresponding to the verification question.

After the verification code picture is generated, the generated verification question and the at least one verification code picture may be correspondingly stored, and an entry for the verification question may be provided for the terminal device.

Optionally, in some embodiments of the present disclosure, a method for generating the answer area includes:

(a) calculating, according to the generated verification question and the answer pattern corresponding to the verification question, a coordinate point area that is obtained by mapping the answer pattern to the verification code picture; and (b) generating the answer area matching the verification question in the verification code picture according to the coordinate point area. The answer area is an effective operation area for the answer pattern. When the trail data of the user falls within a corresponding answer area, it indicates that verification of the answer area is correct, where the answer area may be an effective point operation area for one or more answer patterns, the answer area may be a consecutive or separated area, and only when verification of each answer area is correct, it can be determined that verification succeeds.

The answer area may be represented by a pixel range such as 100px<x<130px and 50px<y<80px provided that the trail data of the user falls within a pre-generated pixel range. The answer area is transmitted to the check background, and the rendered picture is transmitted to the front-end interaction platform together with the question.

Compared with an existing mechanism, in the embodiments of the present disclosure, after at least one pattern is obtained, at least one verification question is generated according to an association relationship between the patterns and object attributes in the patterns, and an answer pattern matching each verification question is correspondingly marked from the at least one pattern. Because the association relationship between the patterns and the object attributes in the patterns may include different dimensions of the verification question, the dimensions of the verification question generated in this way are obviously enhanced. At least one verification code picture is generated according to the object attributes in the patterns and the generated verification question, patterns in the verification code picture satisfying the association relationship, the verification code picture corresponding to the at least one verification question, the verification code picture including an answer area matching the corresponding verification question, and the answer area being an effective operation area that is determined according to an answer pattern of the corresponding verification question. In the present disclosure, the dimensions of the verification question are enhanced, thereby improving anti-cracking performance of the verification code and improving accuracy of human-machine identity verification as well as confronting a current machine learning algorithm to crack the verification code.

Optionally, in some embodiments of the present disclosure, the verification code picture may also be generated according to the at least one random pattern, or the pattern attribute configuration file may be generated.

The at least one verification question corresponding to the verification code picture is generated based on object attributes in random patterns in the verification code picture, and an answer pattern corresponding to each verification question is correspondingly marked in the verification code picture.

An answer area matching the verification question is generated in the verification code picture according to the generated verification question and an answer pattern corresponding to the verification question, finally, the verification question and the verification code picture of the generated answer area are correspondingly stored, and an entry for the verification question is provided for the terminal device.

For example, when a blue sphere and a blue cube in the picture may match a question "click a blue object in the picture", the blue sphere and the blue cube are marked, and then a corresponding verification code picture 1 is generated. When a green cube and a blue cube in the picture may match a question "click a cube in the picture", the green cube and the blue cube are marked, and then a corresponding verification code picture 2 is generated.

Specifically, a verification code picture containing fixed patterns and an association relationship between the fixed patterns is first generated, and then a corresponding verification question is generated, or after a verification question is dynamically matched according to the pattern attribute configuration file, a corresponding verification code picture is dynamically generated according to the matched verification question. This is not limited in the present disclosure provided that the verification code picture and the verification question are generated based on the object attributes in the patterns and the association relationship between the patterns.

Optionally, in some embodiments of the present disclosure, the at least one verification question is obtained based on at least one of the following:

a question rule base, pattern information of the patterns, and the object attributes in the patterns.

For example, when the verification question is generated, the corresponding verification question may be generated based on the pattern information of the obtained patterns or the object attributes in the patterns, or the verification question may be generated based on commonality or similarity between the object attributes in the patterns.

For example, the obtained pattern includes three cubes. Two cubes have same sizes and textures. Therefore, a verification question "click cubes with same sizes and textures" may be generated.

For another example, the obtained pattern includes three cubes, two cylinders, and three spheres. One cube, one cylinder, and two spheres have same colors. Therefore, a verification question "click patterns with same colors" may be generated.

For another example, the obtained pattern includes one bridge, two boats, and two elevated railways. One boat is located at a side of the bridge provided with a sign, and the other boat is located at the other side of the bridge provided with no sign. Therefore, a verification question "click a boat on the bridge closer to a sign" may be generated.

For another example, the obtained pattern includes two boats. There is a person standing on a deck of one boat, and there is no person standing on a deck of the other boat. Therefore, a verification question "click a boat with a person on a deck" may be generated.

Through the foregoing examples, it can be learned that in the embodiments of the present disclosure, a mechanism for generating the verification question is complex, so that a user needs to perform determining from the verification code picture when answering the verification question while in a common program, the verification question is difficult to answer from critical thinking of the user, to improve confrontation of machine learning.

Figure 6:
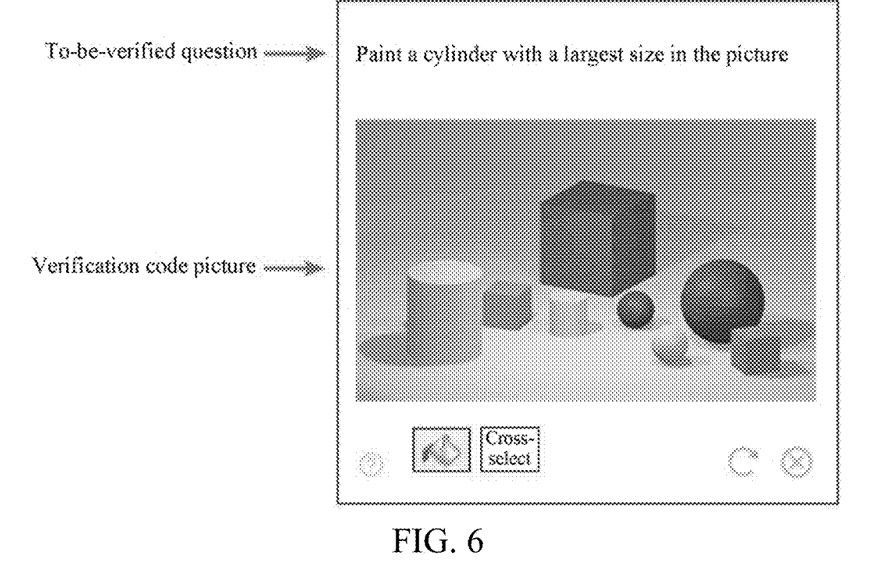
FIG. 6 is another schematic diagram of a verification code according to an embodiment of the present disclosure.

Optionally, in some embodiments of the present disclosure, the method further includes:

(a) transmitting an interaction interface for the verification question to the terminal device after receiving an access request transmitted by the terminal device, the interaction interface including a to-be-verified question, a verification code picture corresponding to the to-be-verified question, and a guiding icon, the guiding icon being used for guiding an interaction manner when the terminal device answers the to-be-verified question, and the guiding icon including click, drag, circle, paint, cross-select, slide, and the like, where FIG. 6 is a schematic diagram of the interaction interface, and the guiding icon includes paint and cross-select;

(b) receiving an instruction that is inputted for the to-be-verified question, the is instruction carrying a question answer, the question answer including at least one pattern in the verification code picture;

(c) obtaining trail data that is generated by the inputted instruction on the verification code picture; and For example, as shown in FIG. 6, the user paints a cylinder for the to-be-verified question, and a trail generated within a painted area is used as trail data of this verification.

Figure 7:
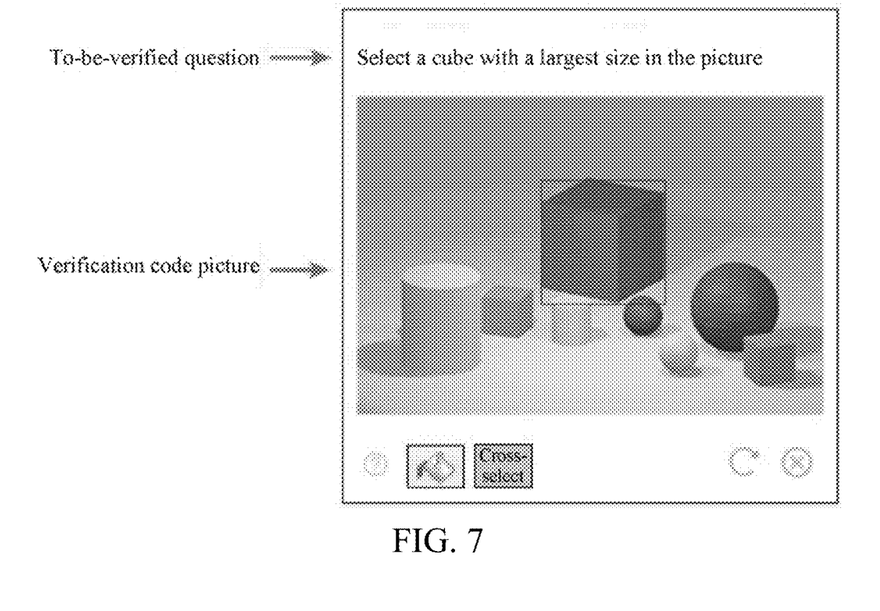
FIG. 7 is another schematic diagram of a verification code according to an embodiment of the present disclosure.

For example, as shown in FIG. 7, the user cross-selects a cube for the to-be-verified question, and a trail generated within a cross-selected area is used as trail data.

Figure 8:
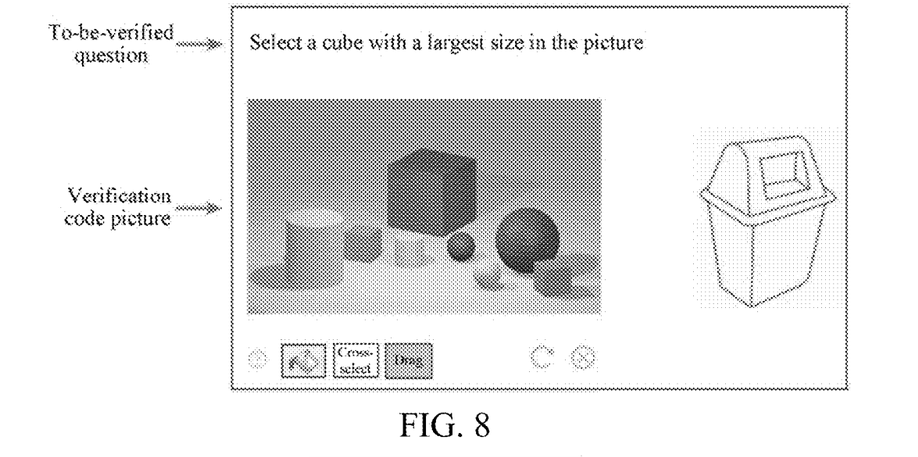
FIG. 8 is another schematic diagram of a verification code according to an embodiment of the present disclosure.

For example, as shown in FIG. 8, the user drags a cube for the to-be-verified question and drags the selected cube to a bucket at the right side of FIG. 8.

(d) verifying, based on the to-be-verified question and the trail data, whether the trail data is within an answer area marked in the verification code picture.

When the trail data is within an answer area marked in the verification code picture corresponding to the to-be-verified question, a verification success message is returned to the terminal device, and it is determined that verification of the terminal device succeeds.

Figure 9:
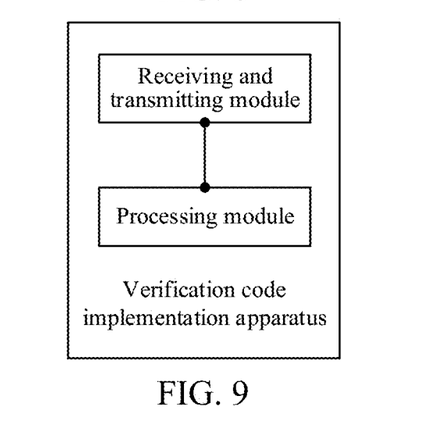
FIG. 9 is a schematic structural diagram of a verification code generation apparatus according to an embodiment of the present disclosure.
Figure 10:
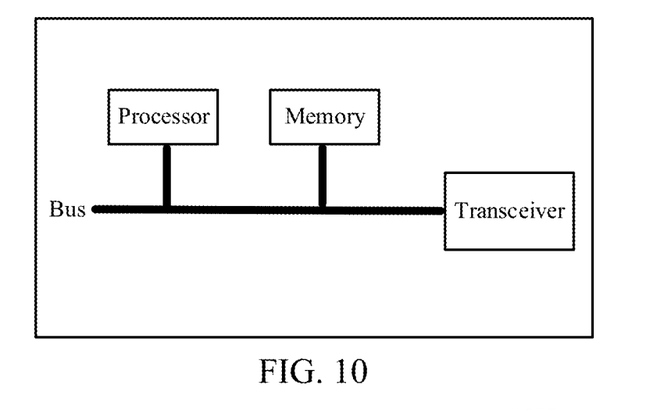
FIG. 10 is another schematic structural diagram of a verification code generation apparatus according to an embodiment of the present disclosure.

Features in an embodiment corresponding to any one of FIG. 1-1 to FIG. 8 are also applied to embodiments corresponding to FIG. 9 and FIG. 10 in the present disclosure. Similar parts are not described in detail in the following.

A verification code generation method in the present disclosure is described above. The following describes an apparatus for performing the verification code generation method. The apparatus may be a server in which a server side is installed or may be a server side installed on the server.

Referring to FIG. 9, the apparatus includes:

a receiving and transmitting module, configured to obtain at least one pattern including one or more objects; and a processing module, configured to determine an association relationship between the patterns and object attributes in the patterns;

generate at least one verification question according to the association relationship between the patterns and the object attributes in the patterns, and correspondingly mark an answer pattern matching each verification question from the at least one pattern; and generate at least one verification code picture according to the at least one pattern, the object attributes in the patterns, and the generated verification question, patterns in the verification code picture satisfying the association relationship, the verification code picture corresponding to the at least one verification question, the verification code picture including an answer area matching the corresponding verification question, and the answer area being an effective operation area that is determined according to an answer pattern of the corresponding verification question.

In the embodiments of the present disclosure, after the receiving and transmitting module obtains at least one pattern, the processing module generates at least one verification question according to an association relationship between the patterns and object attributes in the patterns, and correspondingly marks an answer pattern matching each verification question from the at least one pattern. Because the association relationship between the patterns and the object attributes in the patterns may include different dimensions of the verification question, the dimensions of the verification question generated in this way are obviously enhanced. At least one verification code picture is generated according to the at least one pattern, the object attributes in the patterns, and the generated verification question, patterns in the verification code picture satisfying the association relationship, the verification code picture corresponding to the at least one verification question, the verification code picture including an answer area matching the corresponding verification question, and the answer area being an effective operation area that is determined according to an answer pattern of the corresponding verification question. In the present disclosure, the dimensions of the verification question are enhanced, thereby improving anti-cracking performance of the verification code and improving accuracy of human-machine identity verification as well as confronting a current machine learning algorithm to crack the verification code.

Optionally, the generated verification question and the at least one verification code picture are correspondingly stored, and an entry for the verification question is provided for a terminal device.

Optionally, the object attributes include at least a location of an object in a pattern in a verification code picture, a quantity of same objects, an object size, an object shape, and an object texture; and the association relationship between the patterns includes at least similarity between the patterns, types of objects shown in the patterns, and a spatial relationship between the patterns.

Optionally, in some embodiments of the present disclosure, the processing module is specifically configured to:

combine the at least one pattern according to the association relationship between the patterns and the object attributes in the patterns, to generate a pattern attribute configuration file, the pattern attribute configuration file including pattern information of the patterns, the object attributes in the patterns, and a plurality of objects, the objects corresponding to the patterns;

generate the at least one verification question according to the pattern attribute configuration file; and correspondingly mark, according to the generated verification question, an answer pattern that matches each verification question and that is in the pattern attribute configuration file from the at least one pattern.

Optionally, the at least one verification question is obtained based on at least one of the following:

a question rule base, pattern information of the patterns, and the object attributes in the patterns.

Optionally, in some embodiments of the present disclosure, the processing module is further configured to:

perform rasterization on at least one pattern in the verification code picture.

Optionally, in some embodiments of the present disclosure, the processing module is further configured to:

transmit, through the receiving and transmitting module, an interaction interface of the verification question to a terminal device, the interaction interface including a to-be-verified question, a verification code picture corresponding to the to-be-verified question, and a guiding icon, and the guiding icon being used for guiding an interaction manner in a case that the terminal device answers the to-be-verified question;

receive, through the receiving and transmitting module, an instruction that is inputted by the terminal device for the to-be-verified question;

obtain, through the receiving and transmitting module, trail data that is generated by the inputted instruction on the verification code picture; and determine, in a case that the trail data is within an answer area marked in the verification code picture corresponding to the to-be-verified question, that verification of the terminal device succeeds.

Optionally, in some embodiments of the present disclosure, the processing module is further configured to:

calculate, according to the generated verification question and the answer pattern corresponding to the verification question, a coordinate point area that is obtained by mapping the answer pattern to the verification code picture; and generate the answer area matching the verification question in the verification code picture according to the coordinate point area.

The network authentication server and the terminal device in the embodiments of the present disclosure are described above from the perspective of modularized functional entities, and the server in the embodiments of the present disclosure is described below from the perspective of hardware processing. An entity device corresponding to the receiving and transmitting module in the embodiment shown in FIG. 9 of the present disclosure may be a transceiver, and an entity device corresponding to the processing module may be a processor. The apparatus shown in FIG. 9 may have the structure shown in FIG. 10. When the apparatus shown in FIG. 9 has the structure shown in FIG. 10, the processor and the transceiver in FIG. 10 can implement same or similar functions of the processing module and the receiving and transmitting module provided in the foregoing apparatus embodiment corresponding to the apparatus, and the memory in FIG. 10 stores program code that needs to be called when the processor performs the verification code generation method.

FIG. 11 is a schematic structural diagram of a server according to an embodiment of the present invention. The server 1100 may vary greatly due to different configurations or performance, and may include one or more central processing units (CPU) 1122 (for example, one or more processors) and a memory 1132, and one or more storage media 1130 (for example, one or more mass storage devices) that store an application program 1142 or data 1144. The memory 1132 and the storage medium 1130 may be transient storages or persistent storages. The program stored in the storage medium 1130 may include one or more modules (which is not marked in the figure), and each module may include a series of instruction and operations to the server. Still further, the CPU 1122 may be configured to communicate with the storage medium 1130, and perform, on the server 1100, a series of instructions and operations in the storage medium 1130.

The server 1100 may further include one or more power supplies 1126, one or more wired or wireless network interfaces 1150, one or more input/output interfaces 1158, and/or one or more operating systems 1141, for example, Windows Server, Mac OS X, Unix, Linux, or FreeBSD.

The steps performed by the server in the foregoing embodiments may be based on the server structure shown in FIG. 11.

For example, the central processing unit 1122 may call an instruction stored in the storage medium 1130 to perform the following operations:

obtaining, through the input/output interface 1158, at least one pattern, each pattern including one or more objects;

determining an association relationship between the patterns and object attributes in the patterns;

generating at least one verification question according to the association relationship between the patterns and the object attributes in the patterns, and correspondingly marking an answer pattern matching each verification question from the at least one pattern; and generating at least one verification code picture according to the at least one pattern, the object attributes in the patterns, and the generated verification question, patterns in the verification code picture satisfying the association relationship, the verification code picture corresponding to the at least one verification question, the verification code picture including an answer area matching the corresponding verification question, and the answer area being an effective operation area that is determined according to an answer pattern of the corresponding verification question.

Optionally, the central processing unit 1122 may further call an instruction stored in the storage medium 1130 to perform the following operations:

correspondingly storing the generated verification question and the at least one verification code picture, and providing an entry for the verification question for a terminal device.

Optionally, the object attributes include at least a location of an object in a pattern in a verification code picture, a quantity of same objects, an object size, an object shape, and an object texture; and the association relationship between the patterns includes at least similarity between the patterns, types of objects shown in the patterns, and a spatial relationship between the patterns.

Optionally, the central processing unit 1122 may further call an instruction stored in the storage medium 1130 to perform the following operations:

combining the at least one pattern according to the association relationship between the patterns and the object attributes in the patterns, to generate a pattern attribute configuration file, the pattern attribute configuration file including pattern information of the patterns, the object attributes in the patterns, and a plurality of objects, the objects corresponding to the patterns; and generating the at least one verification question according to the pattern attribute configuration file; and correspondingly marking, according to the generated verification question, an answer pattern that matches each verification question and that is in the pattern attribute configuration file from the at least one pattern.

Optionally, the at least one verification question is obtained based on at least one of the following:

a question rule base, pattern information of the patterns, and the object attributes in the patterns.

Optionally, after the combining the at least one pattern according to the association relationship between the patterns and the object attributes in the patterns, to generate a pattern attribute configuration file, the central processing unit 1122 may further call an instruction stored in the storage medium 1130 to perform the following operations:

performing rasterization on at least one pattern in the verification code picture.

Optionally, the central processing unit 1122 may further call an instruction stored in the storage medium 1130 to perform the following operations:

transmitting, through the input/output interface 1158, an interaction interface of the verification question to a terminal device, the interaction interface including a to-be-verified question, a verification code picture corresponding to the to-be-verified question, and a guiding icon, and the guiding icon being used for guiding an interaction manner in a case that the terminal device answers the to-be-verified question;

receiving, through the input/output interface 1158, an instruction that is inputted by the terminal device for the to-be-verified question;

obtaining, through the input/output interface 1158, trail data that is generated by the inputted instruction on the verification code picture; and determining, in a case that the trail data is within an answer area marked in the verification code picture corresponding to the to-be-verified question, that verification of the terminal device succeeds.

Optionally, the central processing unit 1122 calls an instruction stored in the storage medium 1130 to specifically perform the following operations:

calculating, according to the generated verification question and the answer pattern corresponding to the verification question, a coordinate point area that is obtained by mapping the answer pattern to the verification code picture; and generating the answer area matching the verification question in the verification code picture according to the coordinate point area.

In the foregoing embodiments, the description of each embodiment has respective focuses. For a part that is not described in detail in an embodiment, reference may be made to related descriptions in other embodiments.

It may be clearly understood by a person skilled in the art that for convenience and brevity of description, for a detailed working process of the foregoing system, apparatus, and module, reference may be made to a corresponding process in the foregoing method embodiments, and details are not described herein again.

In the several embodiments provided in the present disclosure, it is to be understood that the disclosed system, apparatus, and method may be implemented in other manners. For example, the described apparatus embodiments are merely examples. For example, division of the modules is merely logical function division and may be other division manners during actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all modules thereof may be selected based on an actual requirement, to implement an objective of the solution in this embodiment.

In addition, functional modules in the embodiments of in the present disclosure may be integrated into one processing module, or each of the modules may exist alone physically, or two or more modules are integrated into one module. The integrated module may be implemented in a form of hardware, or may be implemented in a form of a software functional module. When the integrated module is implemented in the form of a software functional module and sold or used as an independent product, the integrated module may be stored in a computer-readable storage medium.

All or some of the foregoing embodiments may be implemented through software, hardware, firmware, or any combination thereof. When the embodiments are implemented by using software, all or some of the embodiments may be implemented in a form of a computer program product.

The computer program product includes one or more computer instructions.

When the computer program instructions are loaded and executed on a computer, all or some of the processes or functions according to the embodiments of the present disclosure are produced. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer instructions may be transmitted from a website, a computer, a server, or a data center to another website, computer, server, or data center in a wired (such as a coaxial cable, a fiber, or a digital subscriber line (DSL)) or wireless (such as infrared, radio, or microwave) manner. The computer readable storage medium may be any available medium capable of being stored by a computer or include one or more data storage devices integrated by an available medium, such as a server and a data center. The available medium may be a magnetic medium (such as a floppy disk, a hard disk, or a magnetic tape), an optical medium (such as a DVD), a semiconductor medium (such as a solid state disk (SSD)) or the like.

The technical solutions provided in the present disclosure are described above in detail. Although the principles and implementations of the present disclosure are described by using specific examples in the present disclosure, the descriptions of the foregoing embodiments are merely intended to help understand the method and the core idea of the method of the present disclosure. Meanwhile, a person of ordinary skill in the art may make modifications to the specific implementations and application ranges according to the idea of the present disclosure. In conclusion, the content of this specification is not to be construed as a limitation on the present disclosure.

What is claimed is:

1. A verification code generation method, applied to a computing device having one or more processors and memory storing a plurality of programs to be executed by the one or more processors, the method comprising:
    obtaining, using the one or more processors, at least one pattern from the memory, each pattern comprising a plurality of objects;
    determining, using the one or more processors, an association relationship between the at least one pattern and object attributes of the plurality of objects in the at least one pattern;
    generating, using the one or more processors, at least one verification question according to the association relationship between the at least one pattern and the object attributes of the plurality of objects in the at least one pattern, and correspondingly marking an answer pattern matching each verification question from the at least one pattern, wherein the at least one verification question includes a relative correspondence between object attributes of at least two objects of the plurality of objects, the relative correspondence defining relationship between at least two attributes of a first object of the at least two objects and at least two corresponding attributes of a second object of the at least two objects and the answer pattern matching the verification question identifies the at least two objects from the plurality of objects;
    generating, using the one or more processors, at least one verification code picture according to the at least one pattern, the object attributes of the plurality of objects in the at least one pattern, and the generated verification question, the at least one pattern and the object attributes of the plurality of objects in the verification code picture satisfying the association relationship; and
    sending, using the one or more processors, the verification code picture to a remote terminal communicatively connected to the computing device, the verification code picture comprising an answer area matching the corresponding verification question for display to an end user of the terminal, and the answer area being an effective operation area in the verification code picture that is determined by mapping the at least two objects identified in an answer pattern of the corresponding verification question to the verification code picture.

2. The method according to claim 1, further comprising:
    correspondingly storing the generated verification question and the at least one verification code picture and providing an entry for the verification question.

3. The method according to claim 1, wherein the object attributes of the plurality of objects comprise at least a location of an object in a verification code picture, a quantity of same objects, an object size, an object shape, and an object texture; and
    the association relationship between the at least one pattern and the object attributes comprises at least types of objects shown in the at least one pattern, and a spatial relationship between the plurality of objects.

4. The method according to claim 1, wherein the generating at least one verification question according to the association relationship between the at least one pattern and the object attributes of the plurality of objects in the at least one pattern comprises:
    combining the at least one pattern according to the association relationship between the at least one pattern and the object attributes of the plurality of objects in the at least one pattern, to generate a pattern attribute configuration file, the pattern attribute configuration file comprising pattern information of the at least one pattern, the object attributes of the plurality of objects in the at least one pattern, and the plurality of objects, the objects corresponding to the at least one pattern; and
    generating the at least one verification question according to the pattern attribute configuration file; and
    the correspondingly marking an answer pattern matching each verification question from the at least one pattern further comprises:
    correspondingly marking, according to the generated verification question, an answer pattern that matches each verification question and that is in the pattern attribute configuration file from the at least one pattern.

5. The method according to claim 4, wherein the at least one verification question is obtained based on at least one of the following:
    a rule base for generating verification questions, pattern information of the at least one pattern, and the object attributes of the plurality of objects in the at least one pattern.

6. The method according to claim 4, further comprising:
after combining the at least one pattern according to the association relationship between the at least one pattern and the object attributes of the plurality of objects in the at least one pattern, to generate a pattern attribute configuration file:
performing rasterization on at least one pattern in the verification code picture.

7. The method according to claim 1, further comprising:
transmitting an interaction interface of the verification question to a terminal device, the interaction interface comprising a to-be-verified question, a verification code picture corresponding to the to-be-verified question, and a guiding icon, and the guiding icon being used for guiding an interaction manner in a case that the terminal device answers the to-be-verified question;
receiving an instruction from the terminal device for the to-be-verified question;
obtaining trail data that is generated by the instruction on the verification code picture, the trail data corresponding to a location on a display of the terminal device indicating where the end user interacts with the terminal device; and
in accordance with that the trail data is within the answer area marked in the verification code picture corresponding to the to-be-verified question, determining that verification of the terminal device succeeds.

8. The method according to claim 1, wherein the answer area is generated by:
calculating, according to the generated verification question and the answer pattern corresponding to the verification question, a coordinate point area that is obtained by mapping the answer pattern to the verification code picture; and
generating the answer area matching the verification question in the verification code picture according to the coordinate point area.

9. A computing device comprising one or more processors, memory coupled to the one or more processors and a plurality of programs stored in the memory that, when executed by the one or more processors, cause the computing device to perform a plurality of operations comprising:
obtaining, using the one or more processors, at least one pattern from the memory, each pattern comprising a plurality of objects;
determining, using the one or more processors, an association relationship between the at least one pattern and object attributes of the plurality of objects in the at least one pattern;
generating, using the one or more processors, at least one verification question according to the association relationship between the at least one pattern and the object attributes of the plurality of objects in the at least one pattern, and correspondingly marking an answer pattern matching each verification question from the at least one pattern, wherein the at least one verification question includes a relative correspondence between object attributes of at least two objects of the plurality of objects, the relative correspondence defining relationship between at least two attributes of a first object of the at least two objects and at least two corresponding attributes of a second object of the at least two objects and the answer pattern matching the verification question identifies the at least two objects from the plurality of objects;
generating, using the one or more processors, at least one verification code picture according to the at least one pattern, the object attributes of the plurality of objects in the at least one pattern, and the generated verification question, the at least one pattern and the object attributes of the plurality of objects in the verification code picture satisfying the association relationship; and
sending, using the one or more processors, the verification code picture to a remote terminal communicatively connected to the computing device, the verification code picture comprising an answer area matching the corresponding verification question for display to an end user of the terminal, and the answer area being an effective operation area in the verification code picture that is determined by mapping the at least two objects identified in an answer pattern of the corresponding verification question to the verification code picture.

10. The computing device according to claim 9, wherein the plurality of operations further comprise:
correspondingly storing the generated verification question and the at least one verification code picture and providing an entry for the verification question.

11. The computing device according to claim 9, wherein the object attributes of the plurality of objects comprise at least a location of an object in a verification code picture, a quantity of same objects, an object size, an object shape, and an object texture; and
the association relationship between the at least one pattern and the object attributes comprises at least types of objects shown in the at least one pattern, and a spatial relationship between the plurality of objects.

12. The computing device according to claim 9, wherein the generating at least one verification question according to the association relationship between the at least one pattern and the object attributes of the plurality of objects in the at least one pattern comprises:
combining the at least one pattern according to the association relationship between the at least one pattern and the object attributes of the plurality of objects in the at least one pattern, to generate a pattern attribute configuration file, the pattern attribute configuration file comprising pattern information of the at least one pattern, the object attributes of the plurality of objects in the at least one pattern, and the plurality of objects, the objects corresponding to the at least one pattern; and
generating the at least one verification question according to the pattern attribute configuration file; and
the correspondingly marking an answer pattern matching each verification question from the at least one pattern further comprises:
correspondingly marking, according to the generated verification question, an answer pattern that matches each verification question and that is in the pattern attribute configuration file from the at least one pattern.

13. The computing device according to claim 12, wherein the at least one verification question is obtained based on at least one of the following:
a rule base for generating verification questions, pattern information of the at least one pattern, and the object attributes of the plurality of objects in the at least one pattern.

14. The computing device according to claim 12, wherein the plurality of operations further comprise:
after combining the at least one pattern according to the association relationship between the at least one pattern and the object attributes of the plurality of objects in the at least one pattern, to generate a pattern attribute configuration file:

performing rasterization on at least one pattern in the verification code picture.

15. The computing device according to claim 9, wherein the plurality of operations further comprise:
    transmitting an interaction interface of the verification question to a terminal device, the interaction interface comprising a to-be-verified question, a verification code picture corresponding to the to-be-verified question, and a guiding icon, and the guiding icon being used for guiding an interaction manner in a case that the terminal device answers the to-be-verified question;
    receiving an instruction from the terminal device for the to-be-verified question;
    obtaining trail data that is generated by the instruction on the verification code picture, the trail data corresponding to a location on a display of the terminal device indicating where the end user interacts with the terminal device; and
    in accordance with that the trail data is within the answer area marked in the verification code picture corresponding to the to-be-verified question, determining that verification of the terminal device succeeds.

16. The computing device according to claim 9, wherein the answer area is generated by:
    calculating, according to the generated verification question and the answer pattern corresponding to the verification question, a coordinate point area that is obtained by mapping the answer pattern to the verification code picture; and
    generating the answer area matching the verification question in the verification code picture according to the coordinate point area.

17. A non-transitory computer readable storage medium storing a plurality of machine readable instructions in connection with a computing device having one or more processors, wherein the plurality of machine readable instructions, when executed by the one or more processors, cause the computing device to perform a plurality of operations including:
    obtaining, using the one or more processors, at least one pattern from the memory, each pattern comprising a plurality of objects;
    determining, using the one or more processors, an association relationship between the at least one pattern and object attributes of the plurality of objects in the at least one pattern;
    generating, using the one or more processors, at least one verification question according to the association relationship between the at least one pattern and the object attributes of the plurality of objects in the at least one pattern, and correspondingly marking an answer pattern matching each verification question from the at least one pattern, wherein the at least one verification question includes a relative correspondence between object attributes of at least two objects of the plurality of objects, the relative correspondence defining relationship between at least two attributes of a first object of the at least two objects and at least two corresponding attributes of a second object of the at least two objects and the answer pattern matching the verification question identifies the at least two objects from the plurality of objects;
    generating, using the one or more processors, at least one verification code picture according to the at least one pattern, the object attributes of the plurality of objects in the at least one pattern, and the generated verification question, the at least one pattern and the object attributes of the plurality of objects in the verification code picture satisfying the association relationship; and
    sending, using the one or more processors, the verification code picture to a remote terminal communicatively connected to the computing device, the verification code picture comprising an answer area matching the corresponding verification question for display to an end user of the terminal, and the answer area being an effective operation area in the verification code picture that is determined by mapping the at least two objects identified in an answer pattern of the corresponding verification question to the verification code picture.

18. The non-transitory computer readable storage medium according to claim 17, wherein the plurality of operations further comprise:
    correspondingly storing the generated verification question and the at least one verification code picture and providing an entry for the verification question.

19. The non-transitory computer readable storage medium according to claim 17, wherein the object attributes of the plurality of objects comprise at least a location of an object in a verification code picture, a quantity of same objects, an object size, an object shape, and an object texture; and
    the association relationship between the at least one pattern and the object attributes comprises at least types of objects shown in the at least one pattern, and a spatial relationship between the at least one pattern.

20. The non-transitory computer readable storage medium according to claim 17, wherein the plurality of operations further comprise:
    transmitting an interaction interface of the verification question to a terminal device, the interaction interface comprising a to-be-verified question, a verification code picture corresponding to the to-be-verified question, and a guiding icon, and the guiding icon being used for guiding an interaction manner in a case that the terminal device answers the to-be-verified question;
    receiving an instruction from the terminal device for the to-be-verified question;
    obtaining trail data that is generated by the instruction on the verification code picture, the trail data corresponding to a location on a display of the terminal device indicating where the end user interacts with the terminal device; and
    in accordance with that the trail data is within the answer area marked in the verification code picture corresponding to the to-be-verified question, determining that verification of the terminal device succeeds.

* * * * *